Dec. 29, 1964    J. A. JACKSON ETAL    3,162,974
ONE-PIECE BALLOON VALVE AND HOLDER
Filed Nov. 20, 1961

INVENTORS
JAMES A. JACKSON
WALTER L. JACKSON
BY
Knox & Knox

United States Patent Office 3,162,974
Patented Dec. 29, 1964

3,162,974
ONE-PIECE BALLOON VALVE AND HOLDER
James A. Jackson, 1051 Washington Heights Place, and Walter L. Jackson, 1069 Washington Heights Place, both of El Cajon, Calif.
Filed Nov. 20, 1961, Ser. No. 153,613
1 Claim. (Cl. 46—32)

This invention relates to devices for use with inflatable objects, and more particularly to a valve and holder that permits an inflatable object to be inflated and quickly sealed against loss of air, the same simple apparatus being capable of a second or alternative function, namely, as an attachment means whereby a plurality of balloons may be attached to a smooth surface.

Background

Inflatable objects are widely used, particularly those that are inflated by mouth: these ranging from large objects such as floats and mattresses to small objects such as beach balls and balloons. Balloons, in particular, are widely used as toys, decorations, and in games.

One of the problems associated with the use of these inflatable objects is the need to quickly seal them to prevent the escape of the entrapped air. For example, when many balloons are to be used for decoration, or as giveaways, the vendor must inflate and quickly seal a large quantity. Prior-art methods usually involved tying the necks of the balloons with strings or wires, stretching and tying the necks properly, twisting the necks, and the like. None of these methods are completely satisfactory.

Many solutions have been proposed, some of them suggesting the use of ball valves and the like, wherein the pressure within the inflated object presses a ball against a seat, and thus prevents egress of the air.

While many of these solutions have been operable, most have been expensive or impracticable due to the need for moving and/or close-fitting parts.

Another problem arises when balloons are used as decorations. It is frequently desirable to use groups of varicolored balloons, and to fasten them to a given object or location, such as a chandelier, doorway, arch, wall, or the like. Prior-art methods usually depended upon string, adhesive tape, and the like.

It will be realized that a vendor found these prior-art methods inconvenient, time-consuming and expensive.

Objects and Drawings

It is therefore the principal object of our invention to provide an improved device for use in inflating and sealing inflatable objects.

It is another object of our invention to provide a balloon sealing device that may also act as a holder or attachment means for one or more balloons.

The attainment of these objects and others will be realized from the following specification, taken in conjunction with the drawings, in which.

Brief Description of the Invention

Broadly stated, our invention contemplates the use of a body, usually cylindrical, having an axial bore starting at one end and extending partway therethrough. Passageways connect the bore with the outer surface of the body. The neck of the balloon or other inflatable object is then stretched to encircle the bored end, and air is directed through the passageways and the bore into the body of the balloon. When the balloon is satisfactorily inflated, the neck of the balloon is caused to cover the passageways, so that the entrapped air cannot escape.

One embodiment of our invention uses a suction cup for attaching our device to any suitable surface. Another embodiment employs wedge-shaped passageways for receiving and holding the balloon necks, and thus sealing and supporting one or more balloons, the suction cup function being fully retained. Another embodiment of our invention, for use with larger and/or heavier duty inflated objects, incorporates retaining structures that minimize the danger of separating the device from the inflated object.

The theory, principles, structures, embodiments and operation of our invention will become apparent from the following specification.

Detailed Description of the Invention

Figure 1:
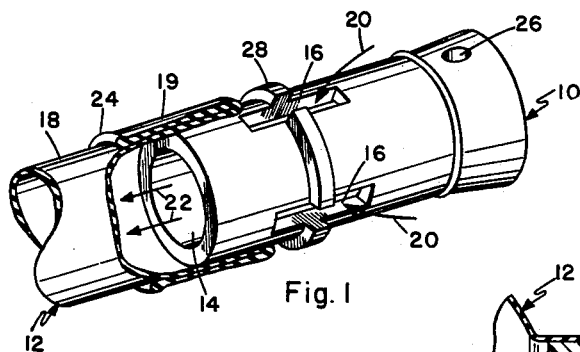
FIGURE 1 is a perspective view of the invention shown with a fragmentary showing of the neck of an inflatable object such as a balloon attached and in the process of being inflated, the said neck being partially cut away for more complete showing of the invention.

Referring now to the drawing wherein like numerals refer to like or identical parts, and referring first to FIGURE 1, our combined inflater and supporting device 10 is shown during the process of inflating a balloon 12. As may be seen, our device takes the form of an elongate body which will usually be a cylinder with an axial bore 14 extending axially thereof and part way therethrough. One or more radially extending passageways 16 connect bore 14 with the surface of unit 10, so that air may easily pass therethrough. When the hereinafter disclosed secondary function as an attachment means for a plurality of balloons is not sought the passageways 16 may, of course, take any convenient shape, such as circular, oval or rectangular.

In use, the neck 18 of balloon 12 is stretched so that it encircles the bored portion of device 10; and then a portion 19 of the neck 18 is folded back onto itself to expose the passageways 16. The distal, unbored portion of device 10 is then inserted into the mouth, with the lips preferably engaging the folded-back portion 19 of the balloon's neck 18. Blowing then causes air from the mouth to enter passageways 16, as shown by arrows 20, and to enter the body of the balloon as shown by arrow 22. The balloon is thus inflated by mouth in much the same as the conventional manner, to as great an extent as may be desired. When the balloon is satisfactorily inflated, the folded-back area 19 is rolled out or unfolded, so that it covers the passageways 16, by the fingers, as the device is withdrawn from the mouth. The thickened terminal portion or bead 24 of the balloon neck 18 permits the rolling back or unfolding to be quickly accomplished and the entrapped inflating air is now prevented from escaping.

Generally speaking, we have found that a satisfactory seal is produced by the frictional engagement between the rubber balloon and the outer surface of device 10. However, it may at times be desirable to form device 10 of material, such as plastic or some forms of rubber, that has a relatively low coefficient of friction. In that case it may be desirable to incorporate into device 10 means, such as a split ring 28, or a plurality of the same, to assure that the neck of the balloon does not slide off device 10. The ring 28 has another important function in reinforcing that part of the bored portion of the device which has been slightly weakened by reason of the slots 16.

If desired, device 10 may have means, such as a transverse bore 26, for attaching the inflated balloon to a stick, string, or the like.

Figure 2:
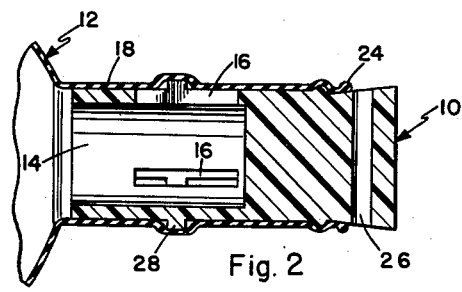
FIGURE 2 is a longitudinal sectional view of the invention and an inflated balloon mounted thereon and sealed against the escape of air.

In FIGURE 2 there is shown a cross section view of our invention with the balloon neck 18 in its sealing position. It is readily apparent that bore 14 and passageway 16 are exposed to pressurized air, but that the air cannot escape because of the sealing relation of the balloon neck covering passageway 16.

Figure 3:
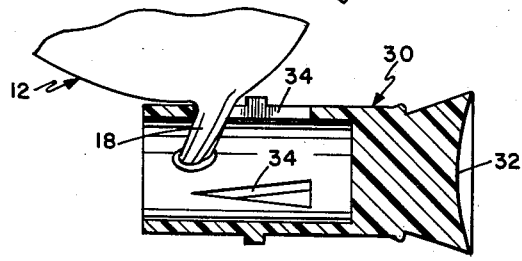
FIGURE 3 is a longitudinal sectional view of another embodiment of the invention being used as a holder or attachment means for a single balloon, it being understood that several slots will be provided in the holder and a plurality of balloons or the like will ordinarily be supported by a single holder.

As previously indicated, there is a need for a balloon sealing device, and a balloon holder; and an embodiment of our invention to simultaneously accomplish both results is shown in FIGURE 3. Here device 30 is similar to the one previously described, with two differences. First, the unbored end of device 30 is formed with balloon attachment means in the form of a suction cup 32 that may be attached to any convenient flat, smooth surface for mounting.

The second difference is that the passageways 34 are tapered. This means that balloons inflated in any manner, either by the use of the device 10 or 30, or otherwise, may have their necks inserted into the wide portion of tapered passageway 34, and pulled to the narrow portion of the passageway. This movement pinches the balloon's neck, and thus seals it to prevent the escape of the entrapped air.

One or more balloons may thus be mounted onto device 30, which can then be attached to any desired surface by means of suction cup 32.

As indicated above, many other objects such as mattresses, floats, beach balls, and the like, are also of the inflated type. These, unlike balloons, are subjected to rough handling and/or external pressure.

Our device is particularly well suited for use with these objects, because, as described above, our device minimizes the loss of air between inflating and sealing. In large inflated objects, minimal loss of air is important, because re-inflation is troublesome.

Figure 4:
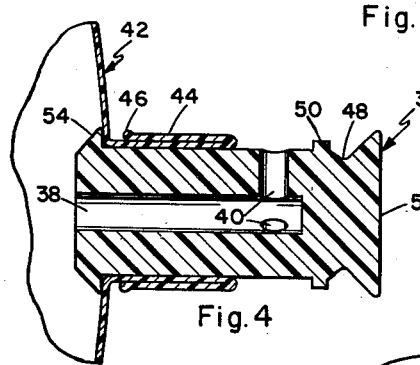
FIGURE 4 is a perspective view of another form of the invention being used to inflate a beach ball.

FIGURE 4 shows an embodiment of our invention that is particularly well suited for inflating large objects, objects that require a somewhat higher air pressure and/or objects that may be roughly handled.

In FIGURE 4, our device 36 is similar to those previously described, except that it is preferably sturdier. This may be accomplished by selection of materials, using a smaller bore 38, utilizing smaller passageways 40, having thicker walls, or any combination thereof.

Figure 5:
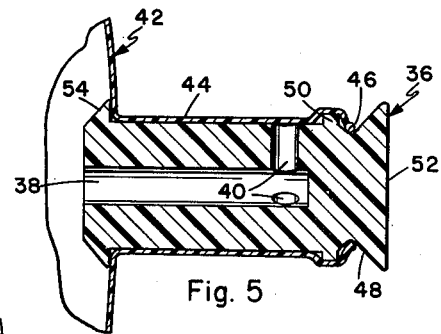
FIGURE 5 is a sectional view of the valve and beach ball in their air-sealing relation.

The object 42 has an inflating tube 44, similar to the neck of the balloon, that is folded back during the inflation process, as described above. Once the object has been fully inflated, the inflating tube is rolled back or unfolded to its normal elongate form, whereupon the enlarged terminal or bead 46 thereof fits into annular groove 48 of device 36, as shown in FIGURE 5. One or more retaining rings 50 aid in maintaining the relative positions of the inflating tube 44 and device 36, and as before mentioned, reinforce the device adjacent to the area where it is necessarily weakened by the radial passageways 40.

When the object has been inflated and sealed, it appears as shown in FIGURE 5. In order to provide a smooth outer surface configuration, device 36 is pushed into the body of object 42 until outer restraining structure or stop 52 is substantially flush with the outer surface of the object. Since the stop 52 has a diameter larger than that of the cylinder, it acts as a restraining means to prevent the device from being pushed into the inflated object.

Figure 6:
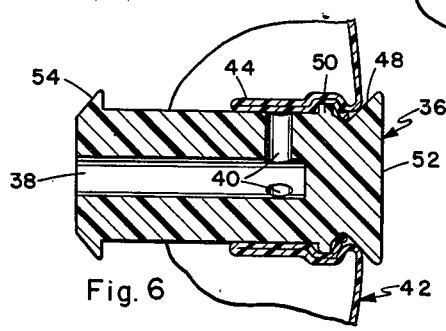
FIGURE 6 is a sectional view of the beach-ball embodiment as it is fully installed in an inflated beach ball.

As the device 36 is being pushed into the portion shown in FIGURE 6, the inflation tube 44 doubles back on itself as shown in FIGURE 6. At the same time, the surface material of object 42 surrounding the inflation tube presses into the annular groove 48, and helps hold the outer face of the sealing device substantially flush with the outer surface of the inflated object.

If during the use of the object, it is roughtly handled, the increased internal air pressure may tend to cause the sealing valve to "pop" out. Ordinarily, it would be lost. However, our device contains a second internal restraining structure, or inner stop 54, which is also of a larger diameter than that of the inflating tube. Should the device 36 tend to pop out, this restraining structure, or inner stop 54, engages the inner surface of the inflated body, and prevents loss of the device. Simultaneously, the friction between the valve and the neck cooperates in preventing loss of the device, so that the elements take the relation shown in FIGURE 5.

In this popped-out condition the passageways are still completely covered, and no air is lost. Restraining structures, or stops 52 and 54, may be discs, flanges, rings, or the like. Finger pressure may be used to reinsert the valve and thus produce the flush relationship of FIGURE 6.

Advantages

It will be realized that our invention provides many desirable features. First, it is easily and cheaply formed of rubber, plastic, or the like. Second, it quickly and securely seals the inflated object against loss of entrapped air. Third, it may incorporate attachment means for attachment to any desired surface. Fourth, it may be modified to hold and seal inflated objects, rather than merely inflating them. Finally, it may be used to inflate, seal, and remain affixed to inflated objects that are larger and/or are subject to rough handling.

It is understood that minor variation from the form of the invention disclosed herein may be made without departure from the spirit and scope of the invention, and that the specification and drawing are to be considered as merely illustrative rather than limiting.

We claim:

A device for sealing and holding inflatable objects comprising:

a cylinder having an axial bore partway therethrough, the unbored portion of said cylinder terminating in a suction cup; and a plurality of tapered passageways interconnecting said bore and the outer surface of said cylinder, said passageways positioned with their larger ends toward said suction cup, and their apexes toward the bored end of said cylinder, whereby inflated objects may have their necks pinched in said tapered passageway to seal them, and said suction cup may be attached to suitable surfaces to support the inflated objects.

References Cited in the file of this patent

UNITED STATES PATENTS

| | | |
|---|---|---|
| 1,814,055 | Napier | July 14, 1931 |
| 2,635,387 | Anderson | Apr. 21, 1953 |
| 2,710,622 | Chupa | June 14, 1955 |
| 2,734,308 | Gassaway | Feb. 14, 1956 |
| 2,792,669 | Jackson et al. | May 21, 1957 |
| 2,924,041 | Jackson et al. | Feb. 9, 1960 |
| 2,975,534 | Lutz | Mar. 21, 1961 |